US010628279B2

(12) United States Patent
Attaluri et al.

(10) Patent No.: US 10,628,279 B2
(45) Date of Patent: Apr. 21, 2020

(54) MEMORY MANAGEMENT IN MULTI-PROCESSOR ENVIRONMENTS BASED ON MEMORY EFFICIENCY

(71) Applicant: International Business Machines Corporation, Armonk, NY (US)

(72) Inventors: Gopi K. Attaluri, Cupertino, CA (US); Ronald J. Barber, San Jose, CA (US); Vijayshankar Raman, Sunnyvale, CA (US); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/444,769

(22) Filed: Feb. 28, 2017

(65) Prior Publication Data

US 2018/0246806 A1  Aug. 30, 2018

(51) Int. Cl.
*G06F 12/02* (2006.01)
*G06F 3/06* (2006.01)
(Continued)

(52) U.S. Cl.
CPC ........ *G06F 11/3433* (2013.01); *G06F 9/5016* (2013.01); *G06F 11/3006* (2013.01);
(Continued)

(58) Field of Classification Search
CPC .... G06F 3/0631; G06F 3/0653; G06F 3/0604; G06F 3/067; G06F 11/3006;
(Continued)

(56) References Cited

U.S. PATENT DOCUMENTS 5,269,013 A * 12/1993 Abramson .............. G06F 12/08
711/170
9,195,599 B2  11/2015 Barber et al.
(Continued)

FOREIGN PATENT DOCUMENTS

WO  2009091829 A1  7/2009
WO  2011090673 A3  7/2011

OTHER PUBLICATIONS

Chandran, KR Sarath et al. "An Efficient Multiprocessor Memory Management Framework Using Multi-Agents." Computer Science & Engineering: An International Journal (CSEIJ), vol. 2, No. 6, Dec. 2012, pp. 65-81.
(Continued)

*Primary Examiner* — Yaima Rigol
*Assistant Examiner* — Edward Waddy, Jr.
(74) *Attorney, Agent, or Firm* — Robert Bunker; Edell, Shapiro & Finnan, LLC

(57) ABSTRACT

To manage memory in a multi-processing system, a memory budget is assigned to each of a number of agents within the multi-processing system. A portion of memory is allocated to each the agents within the memory budget. Metrics are collected for each agent during processing of data by the agents; the metrics include an amount of data processed and an amount of memory used for each agent. Memory efficiency is determined for each agent based on the collected metrics and another memory budget is determined based on the memory efficiency. The portion of the memory is reallocated to the agents within the other memory budget in response to data stored in the memory relative to the assigned memory budget meeting a criterion.

18 Claims, 4 Drawing Sheets

(51) Int. Cl.
  *G06F 11/30* (2006.01)
  *G06F 11/34* (2006.01)
  *G06F 9/50* (2006.01)
(52) U.S. Cl.
  CPC ...... *G06F 11/3017* (2013.01); *G06F 11/3037* (2013.01); *G06F 11/3442* (2013.01)
(58) Field of Classification Search
  CPC ............. G06F 11/3017; G06F 11/3037; G06F 11/3433; G06F 11/3442
  USPC .......................... 711/170, E12.001, E12.002
  See application file for complete search history.

(56) References Cited

U.S. PATENT DOCUMENTS

| | | | |
|---|---|---|---|
| 9,356,883 B1* | 5/2016 | Borthakur | H04L 41/5025 |
| 2001/0054131 A1 | 12/2001 | Alvarez, II et al. | |
| 2002/0147785 A1 | 10/2002 | Venkatsubramanian et al. | |
| 2004/0205304 A1 | 10/2004 | McKenney et al. | |
| 2012/0185735 A1* | 7/2012 | Sambamurthy | G06F 11/079 714/47.1 |
| 2013/0138923 A1 | 5/2013 | Barber et al. | |
| 2014/0359204 A1* | 12/2014 | Yoo | G06F 12/0246 711/103 |
| 2015/0012715 A1 | 1/2015 | Aronovich et al. | |
| 2016/0196086 A1* | 7/2016 | Baskaran | G06F 3/0631 711/170 |
| 2017/0208077 A1* | 7/2017 | Freedman | G06F 16/24568 |
| 2018/0026905 A1* | 1/2018 | Balle | H04L 43/0876 709/226 |

OTHER PUBLICATIONS

Yin, Wenxuan et al. "An Efficient Shared Memory Based Virtual Communication System for Embedded SMP Cluster." 2011 Sixth IEEE International Conference on Networking, Architecture and Storage (NAS), 2011, pp. 288-294.

SAP HANA Database for Next-Generation Business Applications and Real-Time Analytic, retrieved from internet Feb. 2017, 18 pages.

Cieslewicz, John et al., "Adaptive Aggregation on Chip Multiprocessors". VLDB 2007, VLDB Endowment, Sep. 2007, pp. 339-350.

Chen et al., "Tiled-MapReduce: Optimizing Resource Usages of Data-parallel Applications on Multicore with Tiling", PACT '10, Sep. 2010, 12 pages.

Chen et al., "Optimizing MapReduce for GPUs with Effective Shared Memory Usage". HPDC '12, Jun. 2012, 12 pages.

* cited by examiner

MEMORY MANAGEMENT IN MULTI-PROCESSOR ENVIRONMENTS BASED ON MEMORY EFFICIENCY

BACKGROUND

1. Technical Field

Present invention embodiments relate to computer memory management, and more specifically, to managing local/global memory for efficient parallel data processing in multi-processing computer systems.

2. Discussion of the Related Art

Parallel processing by multicore computing systems have wide applicability, including cloud computing where large data analytic workloads are common. Modern multicore processing architecture typically has multiple level memory structures like Level 1/2/3 cache, solid-state drive (SSD) and/or dynamic random-access memory (DRAM), etc. Increasingly, multicore processing platforms have NUMA (non-uniform memory access) characteristics, where the L3 cache and DRAM are actually each made up of "remote socket" and "local socket" portions, with very different access latencies and bandwidth.

System design challenges remain with regard to maximizing the throughput of multicore systems by leveraging the processing power and the resource availability of a multicore system. The main challenges lie with how to distribute a computational job amongst multiple agents in parallel; how to best utilize the resources (memory); how to maximize the parallelism and reduce synchronization among multiple agents; and how to reduce the chance of using a lower level resource on the resource hierarchy. Such would entail, for example, making best use of memory and avoiding "spilling" data to disk (resorting to moving cacheable information to disk).

Conventional designs evenly distribute a job among agents executing in parallel and evenly divide common resources (memory) among agents. However, computational workloads (such as the typical data joining, grouping or aggregation in data analytics) and the distribution of input data are rarely evenly distributed. It is thus common to employ some sub-optimal utilization of the system resulting in poor throughput and performance. Improving performance in multicore systems is an ongoing endeavor by researchers and engineers.

SUMMARY

To manage memory in a multi-processing system, embodiments of the invention assign a memory budget to each of a plurality of agents within the multi-processing system. A portion of memory is allocated to each of the agents within the assigned memory budget. Metrics are collected for each agent during processing of data by the agents; the metrics include an amount of data processed and an amount of memory used for each agent. Memory efficiency is determined for each agent based on the collected metrics and another memory budget for each of the agents based on the determined memory efficiency. The portion of memory is reallocated to each of the agents within the other memory budget in response to data stored in the memory relative to the assigned memory budget meets a criterion.

BRIEF DESCRIPTION OF THE DRAWINGS

Generally, like reference numerals in the various figures are utilized to designate like components.

DETAILED DESCRIPTION

Figure 1:
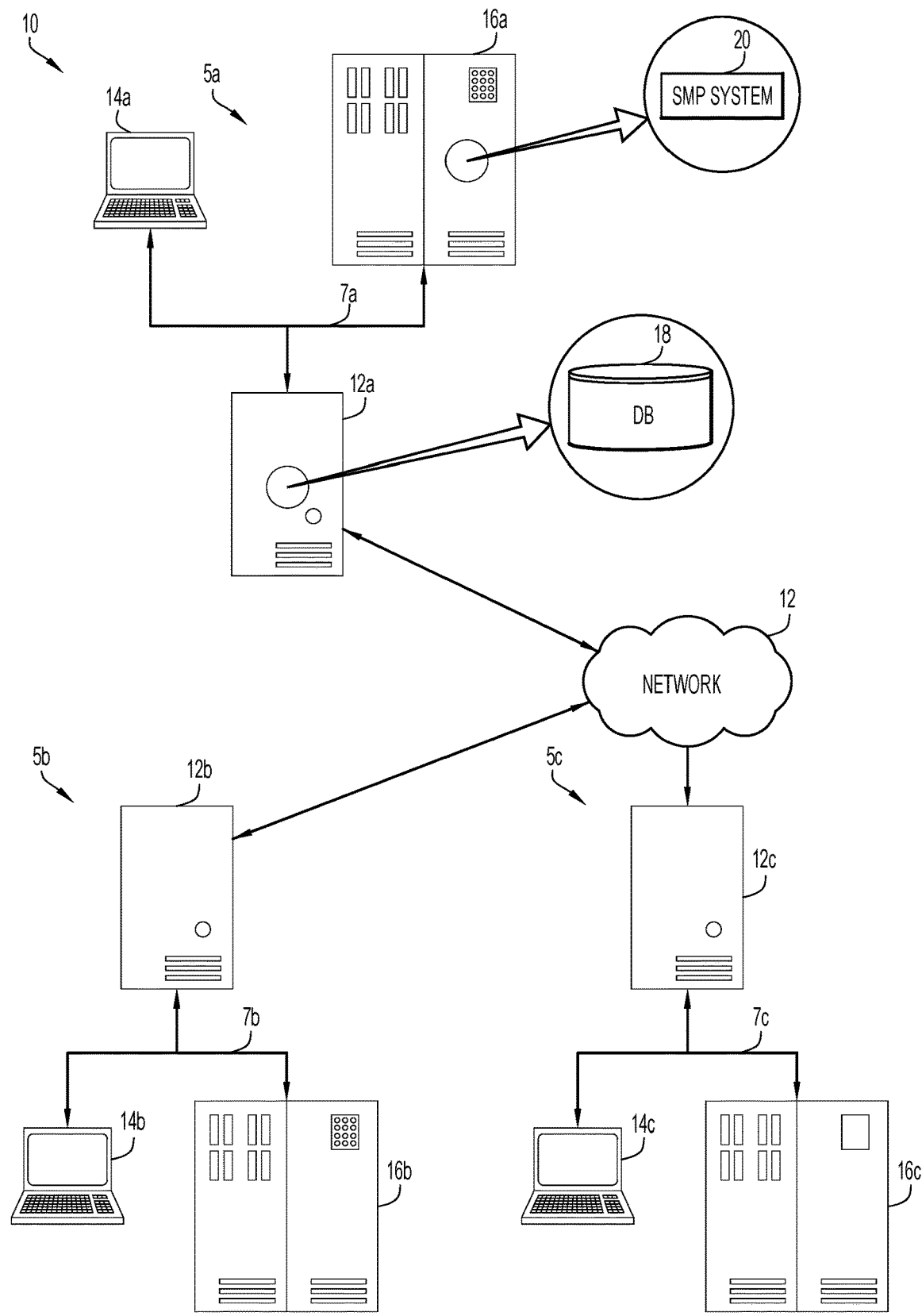
FIG. 1 is a diagram of an example environment by which the present invention can be embodied.

An example environment for use with present invention embodiments is illustrated in FIG. 1. Specifically, the example environment comprises a network infrastructure 10 having one or more equipment centers 5a-5c, representatively referred to herein as equipment center(s) 5. Equipment centers 5 may be geographically-distributed, may be operated independently by separate entities or may be operated by a single entity. Upon review of this disclosure, those having skill in various computing platforms will recognize numerous equipment center configurations that can be used in conjunction with embodiments of the present invention without departing from the spirit and intended scope thereof.

Each equipment center 5 may include one or more server systems 12a-12c, representatively referred to herein as server system(s) 12, one or more client or end-user systems 14a-14c, representatively referred to herein as client system(s) 14 and one or more mainframe systems 16a-16c, representatively referred to herein as mainframe system(s) 16. Server systems 12, client systems 14 and mainframe systems 16 at each equipment center 5 may intercommunicate via respective internal communication networks 7a-7c, representatively referred to herein as internal communication network(s) 7. As such, server systems 12, client systems 14 and mainframe systems 16 can share resources, including, but not limited to, processor resources and memory resources, with higher efficiency than is possible over network 12.

In certain embodiments, mainframe systems 16 implement more computationally-intensive data processing than is realized on either of server systems 12 and client systems 14. Such computationally-intensive processing is hidden from the typical user who would normally interact with server systems 12 through client systems 14. Server systems 12 may thus serve as an interface between the computationally-intensive "back-end" processing and the user at a client system 14. It is to be understood, however, that the present invention is not so limited; those having skill in the parallel processing arts will recognize multiple hardware/software configurations by which the present invention can be practiced without departing from the spirit and intended scope thereof.

Equipment centers 5 may be remote from each other and communicate over a network 12. Network 12 may be implemented by any number of any suitable communications media (e.g., wide area network (WAN), local area network (LAN), Internet, Intranet, etc.). Alternatively, server systems 10, client systems 14 and mainframe systems may be local to each other, and communicate via any appropriate local communication medium (e.g., local area network (LAN), hardwire, wireless link, Intranet, etc.).

Client systems 14 enable users to submit queries or other data processing jobs to server systems 10, which may pass off portions of the job to an SMP system 20 executing on one or more mainframe systems 20. Such a query may target a database system 18 storing various information on behalf of an enterprise or other entity. Database system 18 may be implemented by any conventional or other database or storage unit, may be local to or remote from server systems 10, client systems 14 and mainframe system 16, and may communicate via any appropriate communication medium (e.g., local area network (LAN), wide area network (WAN), Internet, hardwire, wireless link, Intranet, etc.).

Server systems 10 and client systems 14 may be implemented by any conventional or other computer systems preferably equipped with a display or monitor, a base (e.g., including at least one processor (not illustrated), one or more memories (not illustrated) and/or internal or external network interfaces or communications devices (e.g., modem, network cards, etc.) (not illustrated), optional input devices (e.g., a keyboard, mouse or other input device) (not illustrated), and any commercially available and custom software (e.g., server/communications software, browser/interface software, etc.).

Figure 2:
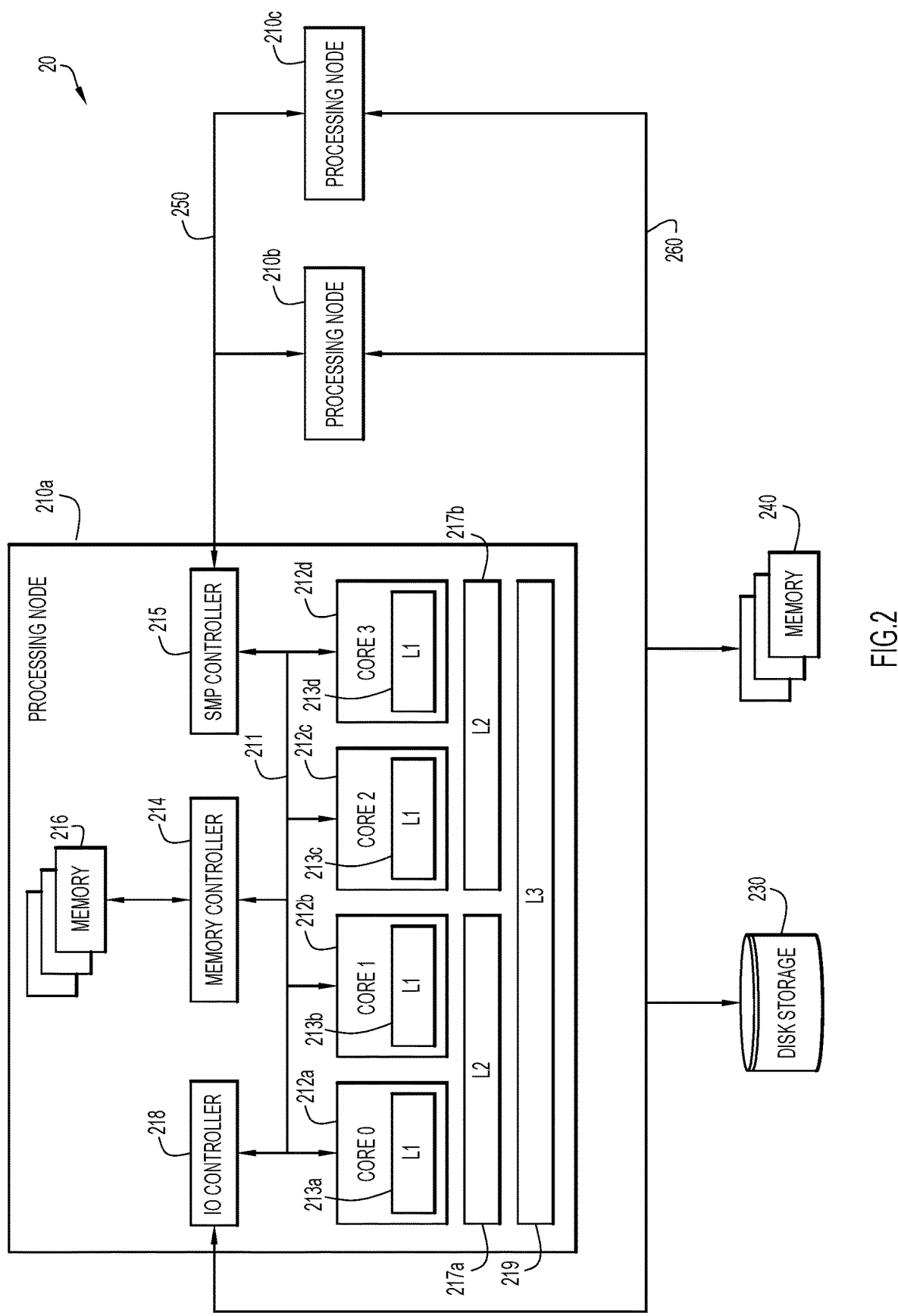
FIG. 2 is a schematic block diagram of an exemplary symmetrical multiprocessor (SMP) system by which the present invention can be embodied.

FIG. 2 is a schematic block diagram of an exemplary SMP system 20 by which the present invention can be embodied. It is to be understood that the arrangement illustrated in FIG. 2 has been simplified for purposes of explaining embodiments of the present invention without congesting the drawing with well-known and conventional implementation details used to realize a complete SMP system. Those having skill in SMP will recognize and appreciate the underlying mechanisms of SMP not illustrated or described herein without such implementation details being fully set forth herein.

As illustrated in FIG. 2, SMP system 20 may comprise a plurality of processing nodes 210a-210c, representatively referred to herein as processing node(s) 210. As used herein, a "processing node" is a hardware/software platform comprising independent processing cores 212a-212d, representatively referred to herein as processing core(s) 212, that are interconnected by a local bus 211 and that require an interface or controller to communicate with external devices, including other such processing nodes 212. In the illustrated embodiment, each processing node 210 comprises an SMP controller 215 for communicating with other processing nodes 210 over a high-speed SMP fabric 250 and an input/output (IO) controller 218 for communicating with other external devices over network communications fabric 260, such as a disk storage system 230 and/or solid state memory system 240. In certain embodiments, disk storage unit 230 and/or memory system 240 are also distributed, even on the same hardware/software platforms that support processing nodes 210. However, for purposes of explanation and not limitation, the external disk storage unit 230 and external solid state memory system 240 are illustrated as being remote from processing nodes 210 at least in the sense that there is a higher penalty for their use relative to that of memory that is local to processing nodes 210. Such penalties include the temporal overhead of communications through IO controller 218 and access times associated with disk storage system 230, as will be understood and appreciated by skilled artisans.

Each processing core 212 may be associated with one or more cache memory systems, such as L1 cache 213a-213d, representatively referred to herein as L1 cache 213, L2 cache 217a-217b, representatively referred to herein as L2 cache 217, and L3 cache 219. Processing nodes 210 may also include respective local memory systems 216 in which processor instructions (e.g., threads) and data may be stored. Each processing node 210 may include a memory controller 214, by which processing cores 212 access and use memory in memory systems 216, both locally (i.e., on the same processor node 210) and remotely (i.e., other than on the same processor node 210). These different memory subsystems with their various access requirements define a memory hierarchy in which access time and locality relative to the processing core 212 define separate hierarchical tiers.

In certain embodiments, SMP system 20 may be based on non-uniform memory access (NUMA), which is a memory design by which memory access time is dependent on the memory location relative to the accessing processing core 212. Under NUMA, a processor can access local memory 216 faster than non-local memory (e.g., memory 216 that is local to another processing core 212 or memory 216 shared between processing cores 212). NUMA provides separate memory allocated for each processing core 212, thereby avoiding performance hits when several processors attempt to address the same memory. For problems involving spread data (common for servers and similar applications), NUMA can improve the performance over a single shared memory by a factor of roughly the number of processors (or separate memory banks).

It is to be understood that memory arrangements other than that illustrated in FIG. 2 can be used in conjunction with the present invention without departing from the spirit and intended scope thereof. For example, in certain embodiments, L2 caches 217 may be internal to individual processing cores 212 and not available to other external processing cores 212. When so embodied, the L3 cache 219 serves as the sole cache memory shared between processing cores.

Figure 3:
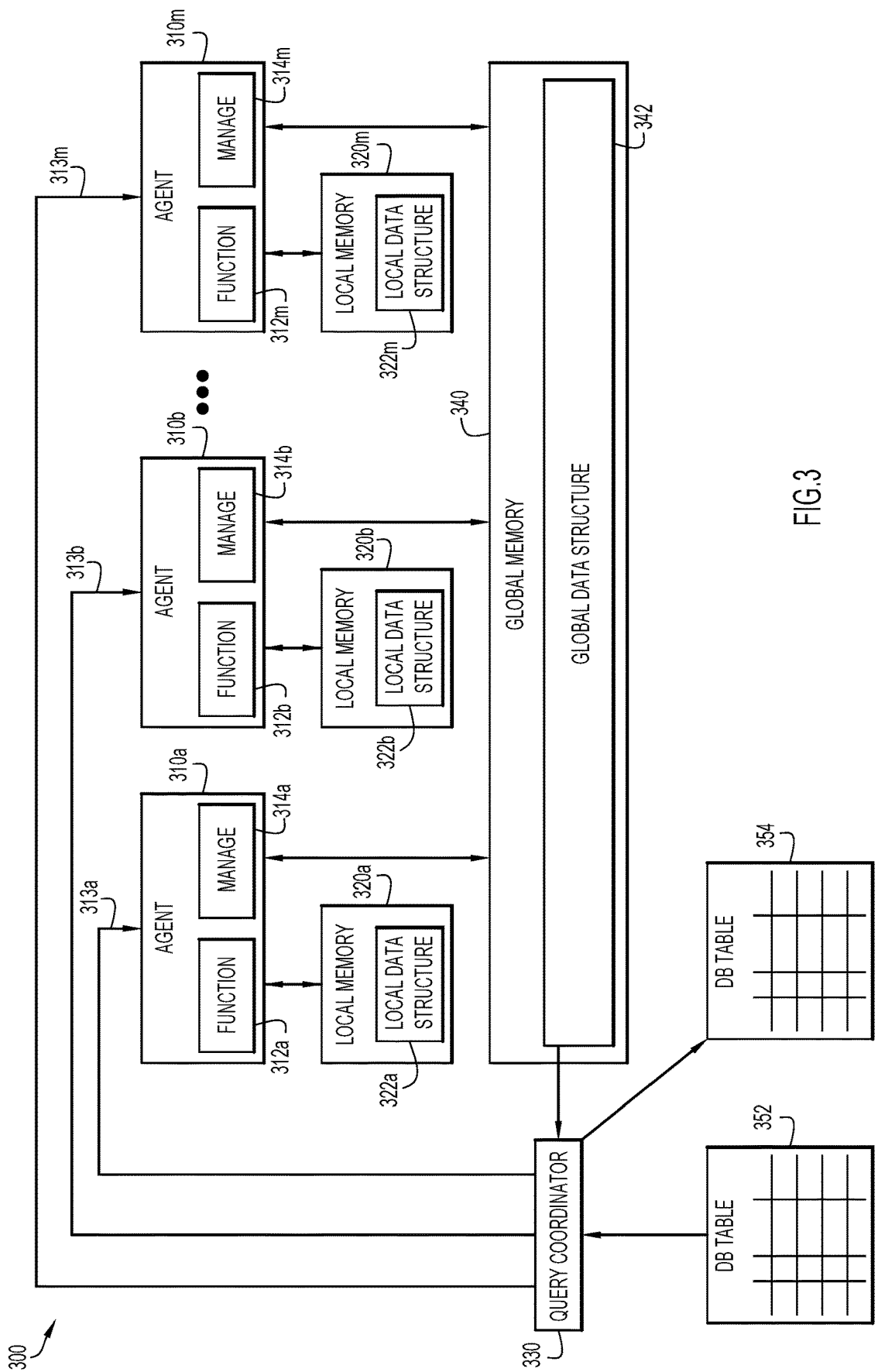
FIG. 3 is a schematic block diagram of an SMP system performing an example parallel data processing operation in accordance with present invention embodiments.

FIG. 3 is a schematic block diagram of an SMP system 300 performing an example parallel data processing operation. SMP system 300 may be considered an abstraction of SMP system 20, with FIG. 3 depicting example operational units and data flows that are implemented in certain embodiments of the invention by the components illustrated in FIG. 2. The description of FIG. 3 is directed to memory utilization of a GROUP BY query operation of the Standard Query Language (SQL), which is a common aggregation process in data analytics. It is to be understood, however, that the present invention is not limited to the example described with reference to FIG. 3; the concept can be generalized for other jobs and resource allocation where similar issues exist.

SMP system 300 may comprise a plurality M of agents 310a-310m, representatively referred to herein as agent(s) 310. As used herein, an "agent" is a processor-executable software entity that carries out some set of operations on behalf of a user or a computer program with some degree of independence or autonomy, and in so doing, employs some knowledge or representation of the user's goals or desires. In certain embodiments, the M agents 310 are independently executed on the respective M processing cores 212 illustrated in FIG. 2 and may include respective functional components 312a-312m, representatively referred to herein as functional component(s) 312, and respective management components 314a-314m, representatively referred to herein as management component(s) 314. Functional components 312 may implement the data processing compelled by the thread executing on that agent 310 and management components 314 may implement control procedures by which the data processing can be accomplished efficiently. It is to be understood that whereas functional components 312 and management components 314 are illustrated as separate mechanisms, such is for purposes of explanation and not limitation. Those having skill in SMP will recognize and appreciate that the data processing and processing control and management are tightly coupled and may require considerable overlap to achieve the target behavior, e.g., parallel GROUP BY processing.

As illustrated in FIG. 3, agents 310 may each be communicatively coupled to respective local memory spaces 320a-320m, representatively referred to herein as local memory space(s) 320, and to a shared global memory space 340. Local memory spaces 320 and global memory space 340 may be realized in the memory hierarchy discussed above with reference to FIG. 2. In certain embodiments, local memory spaces 320 store data that are privately maintained copies of a target data set, e.g., the aggregations of the GROUP BY operation, and can thus avoid delays or other inefficiencies associated with memory access contention, whereas global memory space 240 stores data that is shared among agents 310 and the aforementioned contention inefficiencies cannot be avoided. The working state of agents 310 can be placed in a mix of agent-local memory access state and global (shared across agents) memory access state.

If memory storage is not distributed "smartly" during parallel data processing, some agents 310 may starve for memory while other agents 310 may waste memory. This challenge may be handled in different ways: by spilling some distinct values for some groups to lower (slower/more remote) memory hierarchy tiers when memory requirement is exceeded; by rejecting the query with an error, and demanding more memory for the query and/or by sorting the data and spilling if necessary. Each of these approaches has obvious drawbacks. Embodiments of the present invention utilize memory efficiently and minimize the need for the above actions. The busiest agents are allowed to do more with a larger fast cache allocation, thereby achieving optimal performance.

Memory utilization by agents 310 is managed in accordance with a memory budget that takes into account the efficiencies of individual agents 310 in performing operations using the memory. As used herein, a memory budget is an amount of memory that is set aside for a particular agent 310 should the need for such arise during processing. A memory budget is not an allocation of memory, but rather a guide for future memory allocation based on information gleaned during data processing, e.g., memory utilization efficiency. An agent 310 may allocate memory within its budget incrementally, as needed, or may allocate its entire budget at one time. An agent 310 may also free memory that is being underutilized relative to its memory budget, in which case, the future memory budget for that agent 310 may also be reduced. In certain embodiments, memory allocation is performed in response to a determination of whether memory utilization by the agent 310 relative to its assigned memory budget meets one or more conditions. For example, one condition may be that a portion of memory is freed when an agent's memory utilization is less than a predetermined amount of its assigned memory budget. Another condition may be that an additional portion of memory is allocated to an agent when its memory utilization exceeds its assigned memory budget, or exceeds its budget by a particular amount. Upon review of this disclosure, those having skill in the art will recognize other budget/allocation schemes that can be used in conjunction with the present invention without departing from the spirit and intended scope thereof.

In certain embodiments of the invention, each agent 310 starts with an initial memory budget $B=X/M$, where X is the total memory budget for the operation across agents 310 and M is the number of agents 310 performing or otherwise executing that operation. Total memory budget X may be a system parameter whose setting may be based on system size and resource allocation rules. In certain configurations, X may be smaller than total system memory, but larger than the combined size of cache memories 213, 217 and 219.

Memory may be allocated according to the initial memory budget and local data structures 322a-322m, representatively referred to herein as local data structure(s) 322, private to respective agents 310 may be established within the allocated memory for each agent 310. For the GROUP BY case, local data structures 322 may be sized with space for about $K=(X/M)/(\text{size of each group's key+payload})$ groups. In certain embodiments, local data structures 322 may be cache-friendly hash tables contained in or otherwise local to L1/L2/L3 caches 213, 217, 219 of the processing core 212 implementing the respective agents 310.

A global data structure 342 may be constructed in global memory space 340. Global memory space 340 may be any memory that is accessible from all of the processing agents 310. For example, in certain embodiments, global memory space 340 may be a heap area stored in memory 216 of one or more processing nodes 210 and managed by a concurrency-aware memory allocation scheme. All agents 310 may aggregate into global data structure 342 and indeed do so when no local data structure 322 has been established for a particular agent 310.

The input data for the GROUP BY operation may be obtained from one or more database tables, representatively illustrated at input database table 352. Data from input database table 352 may be distributed among multiple independent agents 310 by a query coordinator 330, or similar management component. Each agent 310 performs partial GROUP BY processing for its input data stream 313a-313m, representatively referred to herein as input data stream(s) 313. In each agent 310, a thread is executed that performs the GROUP BY function, such as by functional component 312, on the data provided in its corresponding data stream 313. As skilled artisans will attest, the GROUP BY process aggregates data having attributes specified in the GROUP BY query clause. The local aggregations are suitably indicated to in the local data structure 322, when possible, and in global data structure 342 when local data structure 322 cannot accommodate more data, e.g., corresponding to more groups. After all the input data are processed by agents 310, the partial aggregation results of each agent 310 are merged into a single global data structure (such as a hash table) and may be presented to a user in an output database table 354.

As data are processed, a resource coordinator 360 or similar management component may periodically assess memory utilization across agents 310 and adjust the memory budget of each agent 310 accordingly. Those agents 310 utilizing their currently allocated memory efficiently may be budgeted a greater amount of memory and those utilizing their allocated memory less efficiently may be budgeted less memory and may be compelled to use global memory 340 for their aggregations. In certain embodiments, resource coordinator 360 may determine the memory budgets and may provide indications of the respective memory budgets to agents 310, such as to management components 314. It is to be understood that while resource coordinator 360 is illustrated in FIG. 3 as a separate component, the functionality thereof may be distributed, such as by messaging between management components 314 of agents 310.

In certain embodiments of the invention, local data structures 322 are monitored to determine whether local data structure 322 for an agent 310 has reached capacity (for some hash table implementations, "capacity" may just mean that lookups are taking too much time, such as when linear probing chain lengths become too long). Such monitoring may be achieved by processes of management component 314. To exceed capacity, the number of groups processed by agent 310 must be greater than K, the number of allocated memory locations in local data structure 322 and, when a local data structure 322 reaches capacity, management component 314 may increase the size of the local data structure 322 by a suitable amount within its memory budget. For example, the number of groups K allocated to a local data structure 322 may be updated to K*1.2. This may be achieved by reallocating memory of the global memory space 340 to local memory/memories 320 for agent-local use. The multiplier 1.2 is an example number that balances memory usage between being very aggressive and pushing too many groups to global data structure 342 (which is good for memory usage but bad for speed given shared memory contentions, among other things), and pushing too little to the global data structure 342 (which is bad for overall memory usage because data stored in global data structure 342 serves all processing agents 310 with a single copy of the data, whereas the same data stored in agent-local data structures 322 must be redundantly maintained at every processing agent 310). In certain embodiments, management component 314 periodically measures the cost of accessing global data structure 342 vs. that of accessing local data structure 322, and the multiplier is chosen according to the ratio of the two access costs. The cost metric may be, for example, access latency and may be measured using counters that are common in modern processors, such as cache-miss counters and cache-miss latency counters.

In certain embodiments, a fraction, e.g., 20%, of the currently least-frequent groups in a local data structure 322 is moved to global data structure 342 so as to keep within its memory budget. Group frequency may be estimated for each group locally to each agent 310 using a small counter in functional component 312 and/or management component 314 that is maintained as data aggregation proceeds. The present invention is not limited to specific counter implementations; the counter may be constructed or otherwise configured to track exact counts or can be probabilistic using conventional statistical techniques. Additionally, moving the groups to global data structure 342 may be done by an affected agent 310 (i.e., that agent 310 that is at capacity), in which case agent 310 must wait for other agents 310 to do the same before the corresponding memory becomes available, or in a synchronized way across all agents 310.

After all agents 310 have completed such data movement, roughly 20% (1−1/M)*X memory locations become free. Such free memory can be used for storing additional groups in local data structure 322. In certain embodiments, a small fraction of the most frequent groups from global structure 342 can be moved into freed memory locations of local data structure 322.

Management component 314 may determine whether memory availability is insufficient for ongoing processing operations, in which case spilling to disk storage system 230 may be imminent. For example, this occurs when there is not enough memory heap space to hold all the thread-local data structures 322 and global data structures 342 together. If so, an estimated spilling size TS can be obtained as the difference between the needed total size of thread-local and global data structures (for example, in a GROUP BY operation, this total size is the number of distinct groups, which can be estimated via single-pass distinct value estimation techniques, multiplied by the size of key plus payload per group), and the amount of memory available for the operation. According to size TS, some or all of local data structures 322 may be merged into global data structure 342, at which time local data structures 322 may be released. Those agents 310 that do not have a local data structure 322 will all share the global data structure 342 to continue their aggregation. Obviously, the least amount of memory that allows all agents 310 to proceed is the amount required to share a single global data structure 342, meaning that each state item (e.g., each group's key and payload information) is stored exactly once. Sharing global structures 342 among agents 310 reduces the likelihood of spilling. If spilling is inevitable after all, other techniques such as partitioning can be used to mitigate the associated costs and achieve reasonably good performance.

Figure 4:
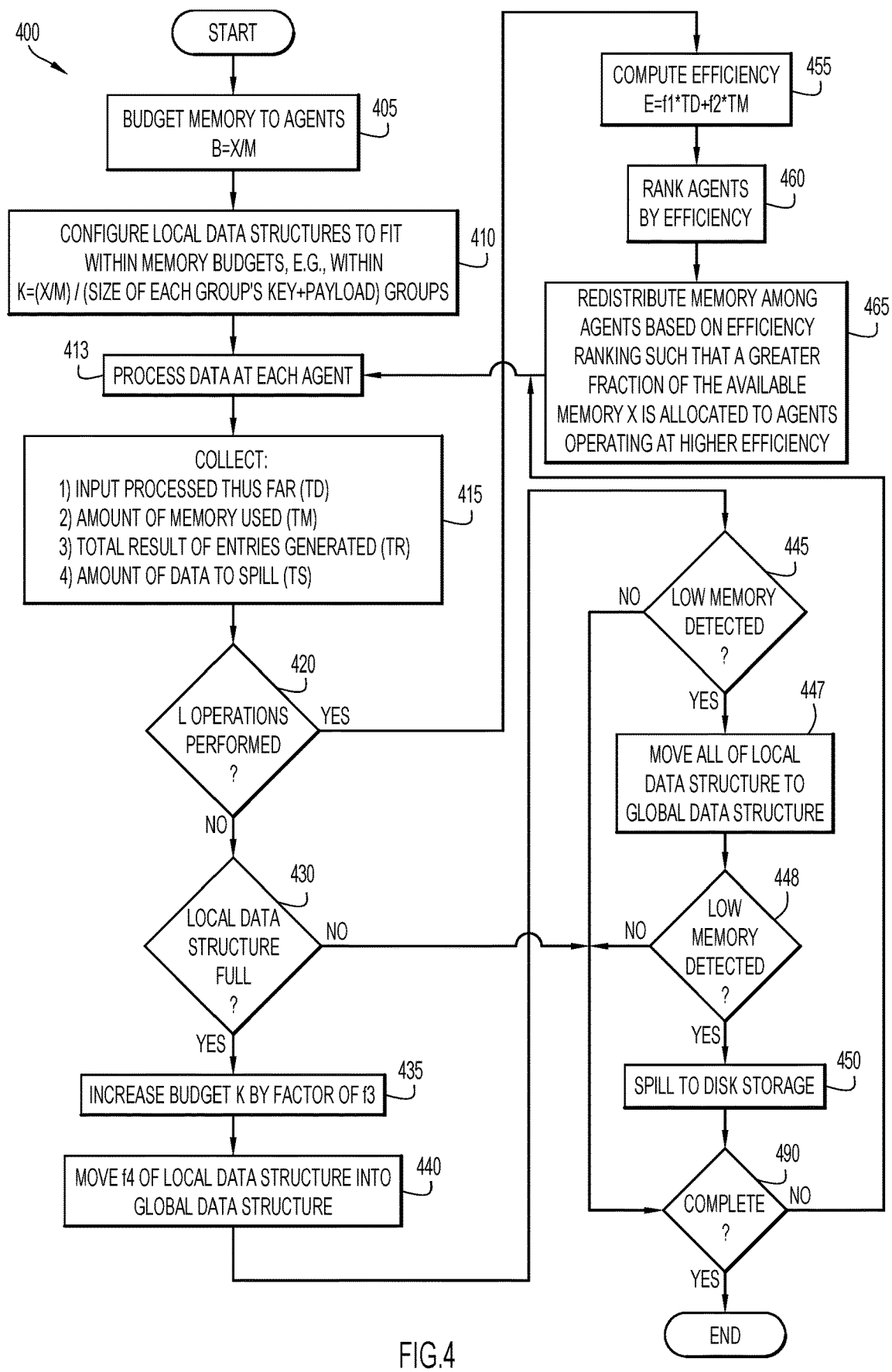
FIG. 4 is a flow diagram illustrating an example memory management process by which the present invention can be embodied.

FIG. 4 is a flow diagram illustrating an example memory management process 400 by which the present invention can be embodied. It is to be assumed that a processing job has been assigned across M agents (or cores) and the total memory available for the applicable job is X across all agents. In operation 405, just prior to query processing, the memory is budgeted across the number M of agents. In certain embodiments, this means each agent is budgeted X/M memory locations. In operation 407, the X/M memory locations are allocated to the agents and, in operation 410, a data structure (e.g., hash table) private to each agent is configured be within the limit of X/M memory locations. In operation 413, each agent starts to process the input data, during which time the following statistics are collected in operation 415: TD, the total amount of input data processed so far; TM, the amount of memory used; TR, the total number of result entries generated (in GROUP BY case, this means the number of groups generated so far), and TS, the amount of data that must be spilled (which incurs I/O penalties). TD, TM, TR and TS may be collected regularly at each agent, such as by management component 314, and used to compute the memory-efficiency of an agent.

Efficiency is achieved when an increasing amount of input is processed, but is diminished when higher amounts of memory are consumed. In the GROUP BY example, this efficiency is a function of the frequency at which groups fall into an agent's private hash table, and in inverse relationship with the amount of memory used by that agent's private hash table. Efficiency is also reduced with the amount of data that has to be spilled to disk storage. Based on these relationships, certain embodiments compute memory-efficiency of each agent at any time as, $E=f1*TD+f2*TM$, where f1 and f2 are weighting factors on TD and TM, respectively. Either or both of f1 and f2 can be positive or negative depending on the corresponding relations to E. In certain embodiments, f1 is positive to favorably weight agents that have processed higher amounts of input data on the previous round of processing. Similarly, f2 is negative to favorably weight agents that consume less memory. Other factors can be weighed to determine overall efficiency for purposes of memory management. TR may be used to determine if one or more agents should merge the data in their local data structure to the global data structure and free the local structure to save memory and avoid spilling. Based on the memory size used by the local data structure of each agent, the sum of those agents' memory locations needs to be larger than TR to make room in main memory to avoid spilling. Additionally, TR can help make the decision process better as a smaller TR (TR is the amount of memory needed to hold the key and payload for the current number of groups: hence if an agent is aggregating well it consumes large amount of inputs into a small amount of memory) means the agent is aggregating data well, and is therefore better using its memory, indicating that the local data structure should be retained in its local memory.

To minimize CPU-overhead, the memory efficiency may be computed and ranked among agents only periodically, such as by resource coordinator 360. Thus, operation 420 of process 400 computes efficiency after an agent has processed a certain amount of data, e.g., L operations. If the L operations have been completed, process 400 may transition to operation 455, whereby memory usage efficiency E is computed. The efficiencies of each agent are ranked, e.g., highest efficiency to lowest, in operation 460 and in operation 465, new budgets for the agents on memory X are determined based on the efficiency ranking such that a greater fraction of the available memory X is allocated to agents operating at higher efficiency.

Embodiment implementations can be flexible as to whether only N out of M agents should have private cache friendly local data structures or allowing all M to have. A weight on each such assignment may be based on the memory efficiency rank, e.g., more efficient agents get more memory for their private local data structure. For example, if only N agents are allowed to have local data structures, the size of those local data structures would be X/N, which is larger than X/M, since N<M. The decision on which agent should share the global data structure may also be based on the ranking of memory efficiency, e.g., less efficient agents would merge their data into the global data structure.

The use of cache friendly private objects are a performance technique for the aggregation processing. Global shared objects are always needed for the final aggregations, if there is any partial aggregations done private to each agent. By design, if an agent does not have an agent local data structure, it can directly access and aggregate in the global hash table with appropriate synchronization. Therefore, if there are any agents directly accessing the global data structure, the memory-efficiency is also computed for the global structure (that is used by any agent that cannot fit all of its data (e.g., groups) in its local data structure). The global structure efficiency may be computed using the same function as used for the local structure efficiency, with TD and TM being the amount of input that is processed in the global hash table and TR being the memory consumption of the global hash table.

In certain embodiments, candidate memory budgets are tested until the memory budget that balances memory efficiency among the agents is found. For example, suppose agents A and B both have 50% of the memory, but A has efficiency 5 and B has efficiency 3. One candidate memory budget (e.g., giving A 60% of the memory and B only 40%) may be tested and it may be determined that, at this new memory budget, A and B both have same efficiency (say 3.5). It can be concluded that giving any greater percentage to agent A would not improve agent efficiencies. Further candidate budgets can be tested until a balanced memory efficiency is found.

If L operations have not been performed, as determined in operation 420, other memory management operations may be conducted. For example, in operation 430, it is determined whether a local data structure has exceeded its memory budget. In such case, the budget for the corresponding local data structure is increased by a factor of f3 (e.g., 1.2) in operation 435 and, in operation 436, memory may be allocated up to the new budget to accommodate additional data. In operation 445, it is determined whether low local memory has been detected. If not, a fraction f4 (e.g., 20%) of the local data structure data is transferred to and/or merged into the global data structure. If low memory has been detected, as determined in operation 445, process 400 may transition to operation 447 by which all of the local data structure is merged into the global data structure. In operation 448, it is determined if low global memory conditions exist. If not, process 400 transitions to operation 490, whereby it is determined whether all processing has been completed. If so, process 400 terminates; otherwise, process 400 may return to operation 413 and continue from that point. If, at operation 448, it is determined that low global memory persists, the global data structure is spilled to disk in operation 450.

If the local data structure has not exceeded its budget, as determined in operation 430, process 400 may transition to operation 490, by it is determined whether all processing has been completed, as described above.

It will be appreciated that the embodiments described above and illustrated in the drawings represent only a few of the many ways of implementing embodiments for memory management in a multi-processor environment.

The environment of the present invention embodiments may include any number of computer or other processing systems (e.g., client or end-user systems, server systems, mainframe systems etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, agents, memory management module, etc.). These systems may include any types of monitors and input devices (e.g., keyboard, mouse, voice recognition, etc.) to enter and/or view information.

It is to be understood that the software (e.g., agents 310, memory management process 400, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., agents 310, memory management process 400, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., enterprise information). The database system may be included within or coupled to the mainframe, server and/or client systems. The database systems and/or storage structures may be remote from or local to the computer or other processing systems, and may store any desired data (e.g., text, numbers, documents, etc.).

The present invention embodiments may employ any number of any type of user interface (e.g., Graphical User Interface (GUI), command-line, prompt, etc.) for obtaining or providing information (e.g., enterprise data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for other database operations and/or other parallel aggregation techniques.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing memory in a multi-processing system comprising:
    assigning a memory budget to each of a plurality of agents within the multi-processing system;
    allocating a portion of memory to each of the plurality of agents within the memory budget assigned respectively thereto;
    collecting metrics for each agent during processing of data by the plurality of agents, wherein the metrics include for each agent an amount of data processed by that agent an amount of the memory used by that agent to process the amount of data, an indication of an amount of excess data relative to the allocated memory portion to be spilled to another memory, and a quantity of result groups generated from the processing of data;
    determining a memory efficiency for each agent based on the amount of data processed by that agent, the amount of the memory used by that agent to process the amount of data, the indication of the amount of excess data, and the quantity of result groups, wherein the memory efficiency indicates memory utilization relative to the amount of data processed;
    determining another memory budget for each of the plurality of agents based on the memory efficiency determined for each agent, wherein greater amounts of memory are allocated to agents with a greater memory efficiency; and
    reallocating the portion of the memory to each of the plurality of agents within the other memory budget responsive to an amount of data stored in the memory relative to the assigned memory budget meeting a criterion.

2. The method of claim 1, wherein the memory efficiency for each agent is based on a weighting applied to the collected metrics.

3. The method of claim 1, further comprising:
    repeatedly determining the memory efficiency for each agent and ranking the memory efficiency of the plurality of agents at periodic intervals; and
    determining the other memory budget for the plurality of agents at the periodic intervals based on the ranking.

4. The method of claim 1, reallocating the memory among the plurality of agents includes:
    transferring data from a local memory of an agent to a global memory based on the corresponding amount of excess data.

5. The method of claim 1, further comprising:
determining a memory efficiency for a global memory accessed by one or more of the plurality of agents;
wherein determining the other memory budget for the plurality of agents further includes:
determining the other memory budget for the plurality of agents based on the memory efficiency of the global memory.

6. The method of claim 1, further comprising:
determining a candidate memory efficiency for each agent based on an adjustment to the memory budget;
wherein determining the other memory budget for the plurality of agents further includes:
apportioning the memory among the plurality of agents in the other memory budget based on the candidate memory efficiency for each agent.

7. The method of claim 1, wherein the metrics are collected during processing of a query with a GROUP BY operation, and the amount of memory used pertains to usage of a hash table.

8. A multi-processing system comprising:
a plurality of processors configured to respectively execute a plurality of agents thereon and to:
assign a memory budget to each of the plurality of agents executing on the processors;
allocate a portion of memory to each of the plurality of agents within the memory budget respectively assigned thereto;
collect metrics for each agent during processing of data by the plurality of agents, wherein the metrics include for each agent an amount of data processed by that agent, an amount of the memory used by that agent to process the amount of data, an indication of an amount of excess data relative to the allocated memory portion to be spilled to another memory, and a quantity of result groups generated from the processing of data;
determine a memory efficiency for each agent based on the amount of data processed by that agent, the amount of the memory used by that agent to process the amount of data, the indication of the amount of excess data, and the quantity of result groups, wherein the memory efficiency indicates memory utilization relative to the amount of data processed;
determine another memory budget for each of the plurality of agents based on the memory efficiency determined for each agent, wherein greater amounts of memory are allocated to agents with a greater memory efficiency; and
reallocate the portion of memory to each of the plurality of agents within the other memory budget responsive to an amount of data stored in the memory relative to the assigned memory budget meeting a criterion.

9. The multi-processing system of claim 8, wherein the memory efficiency for each agent is based on a weighting applied to the collected metrics.

10. The multi-processing system of claim 8, wherein the processors are further configured to:
repeatedly determine the memory efficiency for each agent and rank the memory efficiency of the plurality of agents at periodic intervals; and
determine the other memory budget for the plurality of agents at the periodic intervals based on the ranking.

11. The multi-processing system of claim 8, wherein the processors are further configured to:
transfer data from a local memory of an agent to a global memory based on the corresponding amount of excess data to reallocate memory among the plurality of agents.

12. The multi-processing system of claim 8, wherein the processors are further configured to:
determine a memory efficiency for a global memory accessed by one or more of the plurality of agents; and
determine the other memory budget for the plurality of agents based on the memory efficiency of the global memory.

13. The multi-processing system of claim 8, wherein the processors are further configured to:
determine a candidate memory efficiency for each agent based on an adjustment to the memory budget; and
apportion the memory among the plurality of agents in the other memory budget based on the candidate memory efficiency for each agent.

14. A computer program product for managing memory in a multi-processing system, the computer program product comprising a computer readable storage medium having program instructions embodied therewith, the program instructions executable by a multi-processor computer to cause the computer to:
assign a memory budget to each of a plurality of agents within the multi-processing system;
allocate a portion of memory to each of the plurality of agents within the memory budget assigned respectively thereto;
collect metrics for each agent during processing of data by the plurality of agents, wherein the metrics include for each agent an amount of data processed by that agent, an amount of the memory used by that agent to process the amount of data, an indication of an amount of excess data relative to the allocated memory portion to be spilled to another memory, and a quantity of result groups generated from the processing of data;
determine a memory efficiency for each agent based on the amount of data processed by that agent, the amount of the memory used by that agent to process the amount of data, the indication of the amount of excess data, and the quantity of result groups, wherein the memory efficiency indicates memory utilization relative to the amount of data processed;
determine another memory budget for each of the plurality of agents based on the memory efficiency determined for each agent, wherein greater amounts of memory are allocated to agents with a greater memory efficiency; and
reallocate the portion of the memory to each of the plurality of agents within the other memory budget responsive to an amount of data stored in the memory relative to the assigned memory budget meeting a criterion.

15. The computer program product of claim 14, wherein the program instructions include further instructions that cause the computer to:
apply weights to the collected metrics of each agent to determine the memory efficiency for each agent.

16. The computer program product of claim 14, wherein the program instructions include further instructions that cause the computer to:
repeatedly determine the memory efficiency for each agent and rank the memory efficiency of the plurality of agents at periodic intervals; and
determine the other memory budget for the plurality of agents at the periodic intervals based on the ranking.

17. The computer program product of claim 14, wherein the program instructions include further instructions that cause the computer to:
   determine a memory efficiency for a global memory accessed by one or more of the plurality of agents; and
   determine the other memory budget for the plurality of agents based on the memory efficiency of the global memory.

18. The computer program product of claim 14, wherein the program instructions include further instructions that cause the computer to:
   determine a candidate memory efficiency for each agent based on an adjustment to the memory budget; and
   apportion the memory among the plurality of agents in the other memory budget based on the candidate memory efficiency for each agent.

* * * * *